US009519698B1

(12) United States Patent
Lee et al.

(10) Patent No.: US 9,519,698 B1
(45) Date of Patent: Dec. 13, 2016

(54) VISUALIZATION OF GRAPHICAL REPRESENTATIONS OF LOG FILES

(71) Applicant: International Business Machines Corporation, Armonk, NY (US)

(72) Inventors: Tien Hiong Lee, Singapore (SG); Konstantin Levinski, Singapore (SG); Weng Sing Tang, Singapore (SG); Liang Zhu, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/070,157

(22) Filed: Mar. 15, 2016

Related U.S. Application Data

(63) Continuation of application No. 15/001,305, filed on Jan. 20, 2016.

(51) Int. Cl.
*G06F 17/30* (2006.01)

(52) U.S. Cl.
CPC ............... *G06F 17/30572* (2013.01)

(58) Field of Classification Search
CPC ................................. G06F 17/30572
See application file for complete search history.

(56) References Cited

U.S. PATENT DOCUMENTS

| | | |
|---|---|---|
| 7,446,769 B2 | 11/2008 | Molander et al. |
| 7,676,760 B1 | 3/2010 | Rosenquist et al. |
| 8,103,966 B2 | 1/2012 | Sabato et al. |
| 8,381,193 B2 | 2/2013 | Cervantes |

(Continued)

FOREIGN PATENT DOCUMENTS

| | | |
|---|---|---|
| EP | 2843566 A2 | 3/2015 |
| WO | 2008132341 A2 | 11/2008 |

(Continued)

OTHER PUBLICATIONS

Aharon et al., "One Graph is Worth a Thousand Logs; Uncovering Hidden Structures in Massive System Event Logs", HP-Labs Israel, Technion City, Haifa, Israel, ECML PKDD 2009, Part I, LNAI 5781, pp. 227-243, 2009, © Springer-Verlag Berlin Heidelberg 2009.

(Continued)

*Primary Examiner* — Syed Hasan
(74) *Attorney, Agent, or Firm* — Steven L. Fisher-Stawinski

(57) ABSTRACT

A computer-implemented method includes receiving one or more log files. Each of the one or more log files includes one or more logs. The computer-implemented method further includes extracting one or more event records from said one or more logs. The computer-implemented method further includes, for each event record of the one or more event records, determining one or more attributes and one or more dimensions based on the event record, respectively. The computer-implemented method further includes grouping the one or more event records into one or more attribute groups. The computer-implemented method further includes ordering the one or more event records of each of the one or more attribute groups by the one or more dimensions. The computer-implemented method further includes generating one or more graphical representations of the one or more attribute groups. A corresponding computer system and computer program product are also disclosed.

1 Claim, 5 Drawing Sheets

(56) References Cited

U.S. PATENT DOCUMENTS

| | | | |
|---|---|---|---|
| 8,386,466 B2 | 2/2013 | Park et al. | |
| 2002/0188618 A1* | 12/2002 | Ma | G06T 11/206 |
| 2004/0030537 A1* | 2/2004 | Barnard | H04L 41/06 |
| | | | 702/194 |
| 2007/0260932 A1 | 11/2007 | Prichard et al. | |
| 2009/0024911 A1 | 1/2009 | Margolis | |
| 2010/0115443 A1 | 5/2010 | Richstein | |
| 2011/0185234 A1 | 7/2011 | Cohen et al. | |
| 2011/0227925 A1 | 9/2011 | De Pauw et al. | |
| 2012/0229466 A1* | 9/2012 | Riche | G06F 17/30572 |
| | | | 345/440 |
| 2014/0149924 A1 | 5/2014 | Sharp et al. | |
| 2014/0157178 A1 | 6/2014 | Adams | |
| 2015/0375083 A1* | 12/2015 | Stelfox | A63B 71/06 |
| | | | 700/91 |
| 2016/0085810 A1 | 3/2016 | de Castro Alves et al. | |

FOREIGN PATENT DOCUMENTS

| | | | |
|---|---|---|---|
| WO | 2014196980 A1 | 12/2014 | |
| WO | 2015065388 A1 | 5/2015 | |

OTHER PUBLICATIONS

Takada et al., "MieLog: A Highly Interactive Visual Log Browser Using Information Visualization and Statistical Analysis", pp. 133-144 of the Proceedings of LISA '02: Sixteenth Systems Administration Conference, (Berkeley, CA: USENIX Association, 2002), 34 pages.

Lee et al., "Visualization of Graphical Representations of Log Files", U.S. Appl. No. 15/001,305, filed Jan. 20, 2016, 26 pages.

IBM, "List of IBM Patents or Patent Applications Treated As Related", Appendix P, dated May 31, 2016, 2 pages.

\* cited by examiner

VISUALIZATION OF GRAPHICAL REPRESENTATIONS OF LOG FILES

BACKGROUND

The present invention relates generally to log file handling and in particular to visualization of log files.

Generally, operating systems, software frameworks, and programs include a logging system, which generates a log file including raw logs of events that occur during the operation of a computer system. The log file provides users with a diagnostic audit trail of a system and to diagnose problems. Typically, raw logs are presented as structured data written in text format. A log file may include voluminous event data over thousands of lines and originating from a multitude of sources. Each log entry provides details of an event occurring in the computer system. Logs are typically appended to as events occur, so the entries are typically ordered chronologically. However, the text-based nature of log files may make it difficult to identify correlations and patterns across entries.

SUMMARY

A computer-implemented method includes receiving one or more log files. Each of the one or more log files includes one or more logs. The computer-implemented method further includes extracting one or more event records from said one or more logs. The computer-implemented method further includes, for each event record of the one or more event records, determining one or more attributes based on the event record. The computer-implemented method further includes, for each event record of the one or more event records, determining one or more dimensions based on the event record. The computer-implemented method further includes grouping the one or more event records into one or more attribute groups. The computer-implemented method further includes ordering the one or more event records of each of the one or more attribute groups by the one or more dimensions. The computer-implemented method further includes generating one or more graphical representations of the one or more attribute groups. A corresponding computer system and computer program product are also disclosed.

DETAILED DESCRIPTION

Figure 1:
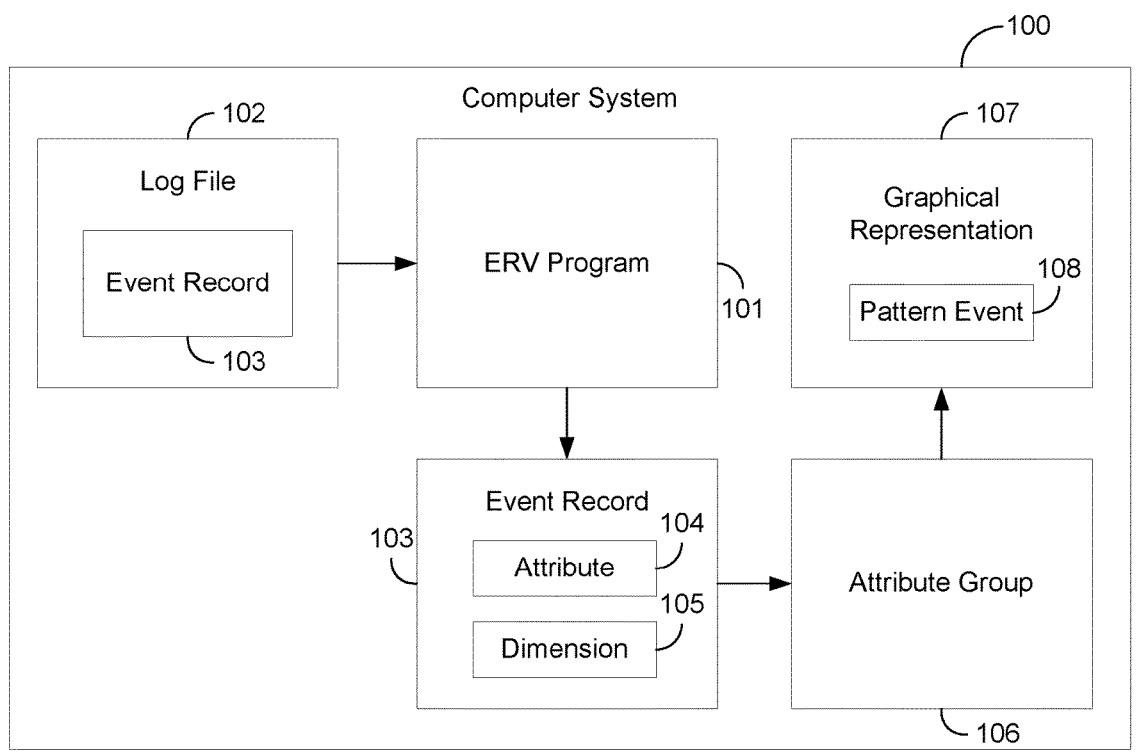
FIG. 1 is a block diagram of one embodiment of a computer system environment 100 suitable for operation in accordance with at least one embodiment of the invention.

Referring now to various embodiments of the invention in more detail, FIG. 1 is a block diagram depicting one embodiment of a computer system environment suitable for operation in accordance with at least one embodiment of the invention. Within a computer system 100, an event record visualization ("ERV") program 101 may receive one or more log files 102. Each of the one or more log files 102 may include one or more logs. A log may be presented as structured data written in text format. The ERV program 101 may further extract one or more event records 103 from the one or more logs. More specifically, an event record 103 is one type of log that provides details of an event executed by a system based on the time the event occurs. The ERV program 101 may further normalize each of the one or more event records 103. Normalization may be understood as the process of decomposing a table into less redundant (and smaller) tables without losing information.

The ERV program 101 may further, for each event record 103 of the one or more event records 103, determine one or more attributes 104 based on the event record. An attribute 104 may be understood as a piece of information that determines the properties of a field or tag in a database or a string of characters in a display. More specifically, attributes 104 are metadata attached to a field or a block of code. The ERV program 101 may further, for each event record 103 of the one or more event records 103, determine one or more dimensions 105 based on the event record 103. A dimension 105 may be understood as a numerical value of a certain parameter, which is either continuous or could be ordered. Examples of dimensions may include, but are not limited to time, frequency, and message length.

The ERV program 101 may further group the one or more event records 103 into one or more attribute groups 106. The ERV program 101 may further order the one or more event records 103 of each of the one or more attribute groups 106 by one or more dimensions 105. The ERV program 101 may further generate one or more graphical representations 107 of the one or more attribute groups 106. The graphical representation 107 may generally be in the form of any known types of graphs, and more specifically, may be in the form of a scatter plot. The scatter plot may display data based on at least one of the one or more events records 103, at least one of the one or more attributes 104, and at least one of the one or more dimensions 105.

Figure 2:
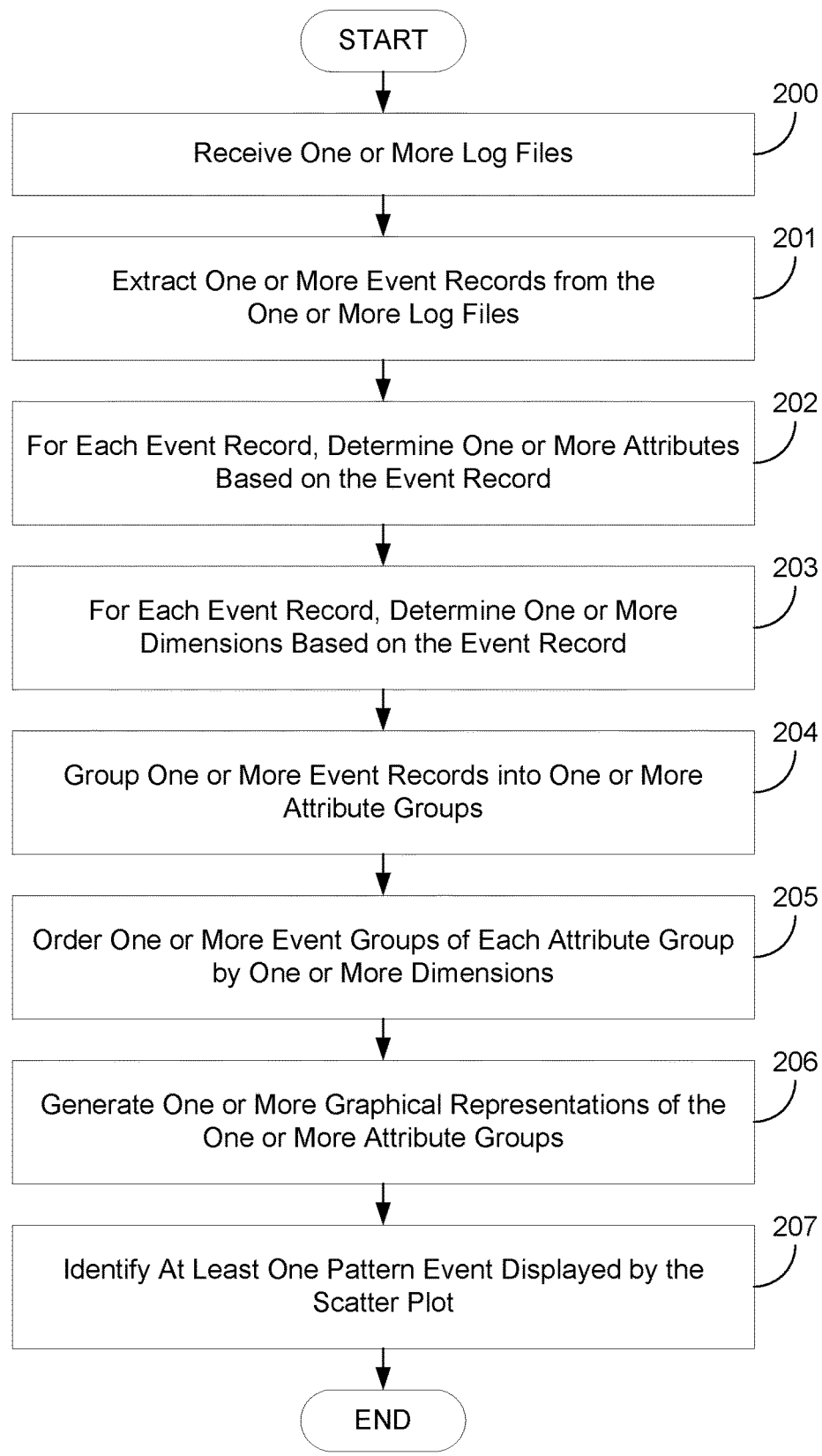
FIG. 2 is a flow chart diagram depicting the event record visualization program 101 in accordance with at least one embodiment of the invention.

FIG. 2 is a flow chart diagram depicting various steps for the ERV program in accordance with at least one embodiment of the invention. According to the depicted embodiment, at step 200, the ERV program 101 may receive one or more log files 102. Each of the one or more log files 102 may include one or more logs. The ERV program 101 may receive one or more log files 102 from one or more computer systems, one or more software components, or one or more databases. More specifically, the ERV program 101 may exist in a cloud-based, virtual, or distributed environment or a remote environment on defined server hardware, or more generally, the ERV program 101 may exist in any type of environment suitable for receiving log files 102.

At step 201, the ERV program 101 may extract one or more event records 103 from the one or more logs. The ERV program 101 may extract the one or more event records 103 by any generally known text extraction methods, such as natural language processing ("NLP"). The ERV program 101 may further normalize the content of each of the one or more event records 103 extracted from the one or more logs. Here, the ERV program 101 may normalize the content of one or more event records 103 to yield an event message (a free form text string that includes text or data). More specifically, the ERV program 101 may normalize variable fields (e.g., months, days of the week, and numbers, etc.) located within the one or more event records 103 into a set of predefined symbols.

At step 202, the ERV program 101 may, for each event record 103 of the one or more event records 103, determine one or more attributes 104 based on the event record 103. An attribute 104 may be understood as a specification that defines a property of an object, element, or file. More specifically, an attribute 104 may be considered metadata. For example, an event record 103 may include the following elements: event message, event origin, and event type. The corresponding attribute 104 of an event message may be "normalized content of the event record." The corresponding attribute 104 of an event origin may be "name of the log file containing the event record." The corresponding attribute 104 of an event type may be "the type of log event" (e.g., INFO or WARNING). An attribute 104 may be determined by any generally known methods. For example, the event message may be extracted from the content of the original event record 103. The origin of the event record 103 may be extracted from the name of the log file 102 containing the event record 103. The event type may be extracted from the original content of the event record 103.

At step 203, the ERV program 101 may, for each event record 103 of the one or more event records 103, determine one or more dimensions 105 based on the event record 103. A dimension 105 may be understood as a numerical value of a certain parameter, which is either continuous or could be ordered. For example, an event record 103 may include the following dimensions 105: time of occurrence, message length, frequency of occurrence, and importance. A dimension 105 may be determined by any generally known methods. For example, the time of occurrence may be extracted from the original content of the event record 103. The message length may be obtained from the record message. The frequency of occurrence may be calculated by the number of event records 103 having a common event message and total time period. The importance may be inferred from the original content of the event record 103.

At step 204, the ERV program 101 may group the one or more event records 103 into one or more attribute groups 106. Here, the one or more event records 103 may be grouped according to their event message, event origin, and event type. At step 205, the ERV program 101 may order the one or more event records 103 of each of the one or more attribute groups 106 by the one or more dimensions 105. More specifically, the one or more event records 103 of each attribute group 106 may be ordered linearly by the one or more dimensions 105. Here, the ERV program 101 may order the one or more event records 103 of each of the one or more attribute groups 106 according to one or more metrics (e.g., time of occurrence, message length, frequency of occurrence, importance, and relevance).

Figure 3:
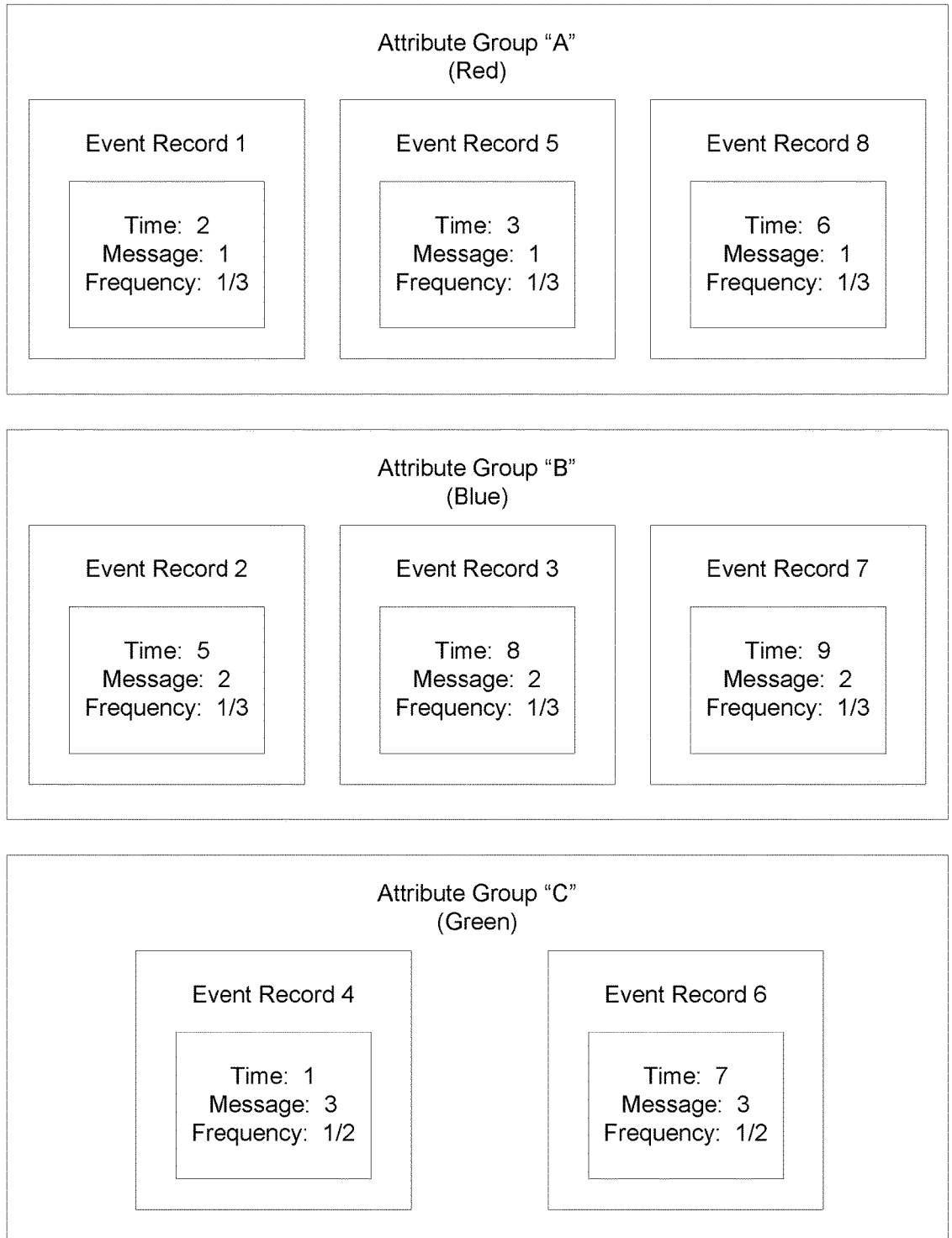
FIG. 3 is an exemplary diagram for a portion of a worked example of the event record visualization program 101 in accordance with at least one embodiment of the invention.

FIG. 3 is an exemplary diagram for a portion of a worked example of the ERV program 101 in accordance with at least one embodiment of the invention. In FIG. 3, grouping of one or more event records 103 based on the attribute 104 "event message" can be seen. Given the attribute 104 "event message," event records 103 with the same value are grouped together in a hash table. The ERV program 101 may group the one or more event records 103 based on the attribute 104 "event message" using a common hash calculated from the value. Each attribute 104 including the one or more event records 103 may further be assigned a unique color for identification purposes in a graphical representation 107. In this example, attribute group 106 "A" has been assigned the color red and includes event records 1, 5, and 8. Each of the event records 1, 5, and 8 have a common event message "1" and a frequency of ⅓. Attribute group 106 "B" has been assigned the color blue and includes event records 2, 3, and 7. Event records 2, 3, and 7 have a common event message "2" and a frequency of ⅓. Attribute group 106 "C" has been assigned the color green and includes event records 4 and 6. Each of the event records 4 and 6 have a common event message "3" and a frequency of ½. It should be appreciated that the ERV program 101 may group one or more event records 103 by any of the previously mentioned one or more attributes 104.

Referring now to FIG. 2, at step 206, the ERV program 101 may generate one or more graphical representations 107 of the one or more attribute groups 106. By using any combination of attributes 104 and dimensions 105, the one or more event records 103 may be visualized through one or more graphical representations 107. Plotting of the graph may be accomplished with graphing libraries implemented in any generally known user interface ("UI") frameworks.

In one embodiment of the invention, the graphical representation 107 may be a scatter plot. It should be appreciated that the scatter plot may have any number of known dimensions 105. Here, the scatter plot may display data based on at least one or more event records 103, at least one or more attributes 104, and at least one or more dimensions 105. More specifically, dots on the scatter plot may represent the one or more event records 103. The dots may further be labeled with different colors in order to distinguish grouping of one attribute group 106 from another. Additionally, one or more of the dimensions 105 may be used to form the vertical and horizontal coordinate axis of the scatter plot.

Figure 4:
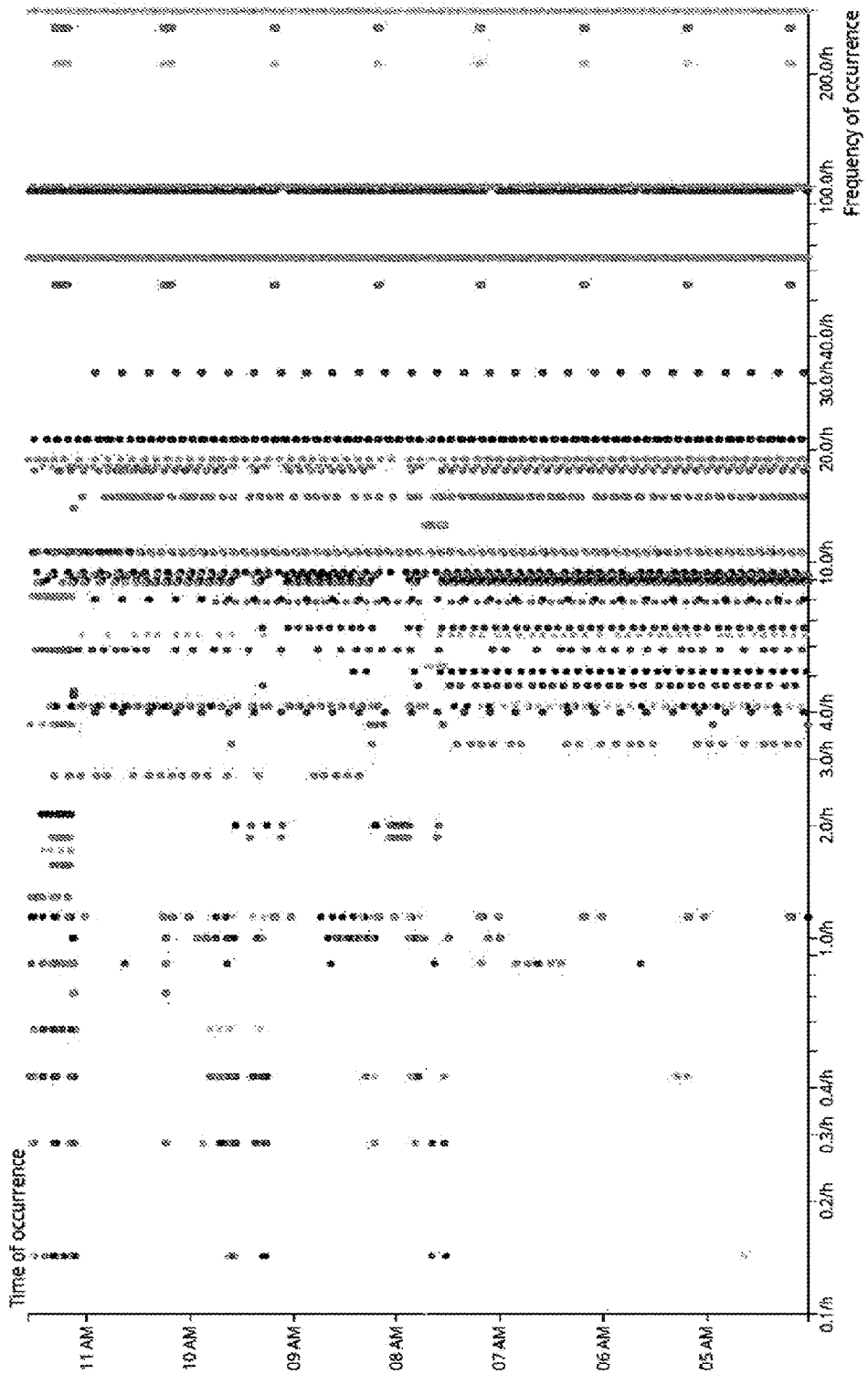
FIG. 4 is an exemplary diagram for a portion of a worked example of the event record visualization program 101 in accordance with at least one embodiment of the invention.

FIG. 4 is an exemplary diagram for a portion of a worked example of the ERV program 101 in accordance with at least one embodiment of the invention. In FIG. 4, a two dimensional scatter plot for one or more event records 103 can be seen. More specifically, the ERV program 101 has generated a two dimensional scatter plot for the attribute group 106 "event message" and dimensions 105 "time" and "frequency." Here, a colored dot has been assigned to each attribute group 106 based on the type of "event message." Dots with the same color represent event records 103 with the same event message. Furthermore, the dimension 105 "time" has been assigned to the vertical coordinate axis and the dimension 105 "frequency" has been assigned to the horizontal coordinate axis. Thus, vertical position of a dot may denote the time of occurrence (increasing from bottom to top) and a horizontal position of a dot may denote the frequency of occurrence (increasing from left to right). It should be appreciated that any possible combinations of attributes 104 and dimensions 105 may be used. For example, the scatter plot may include the attribute 104 "event type" and the dimensions 105 "time" and "message length." In another example, the scatter plot may include the attribute 104 "event origin" and the dimensions 105 "frequency" and "importance."

Referring now to FIG. 2, at step 207, the ERV program 101 may identify at least one pattern event 108 displayed by the scatter plot. More specifically, a pattern event 108 may be understood as a pattern of events for a particular attribute 104 of an event record 103 based on one or more dimensions 105. The scatter plot may identify at least one pattern event 108 selected from the group consisting of: repeated events; periodical events; missing events; abnormal events; and related events.

Referring now to FIG. 4, one or more pattern events 108 may be seen. For example, a "repeated events" pattern event 108 may be event records 103 with the same record message and frequency. A "repeated events" pattern event 108 may be identified by dots having the same color that align in the frequency axis. In another example, a "periodical events" pattern event 108 may be repeated event records 103 that happen at a fixed time interval. A "periodical events" pattern event 108 may be identified by dots representing repeated event records 103 that align at fixed intervals. In a further example, a "missing events" pattern event 108 may be event records 103 that are supposed to be part of periodical events, but are missing from the graph. A "missing events" pattern event 108 may be identified by missing dots from periodical events. In yet another example, an "abnormal events" pattern event 108 may be repeated event records 103 that occur many times in a small period of time. An "abnormal events" pattern event 108 may be identified by dots clustered together with a high frequency." In another example, a "related events" pattern event 108 may be event records 103 that consistently appear together, with the same or similar frequencies. A "related events" pattern event 108 may be identified by a group of dots consisting of one or more colors that are closely grouped together.

It should be appreciated that the scatter plot generated by the ERV program 101 may serve as an interface for a user to perform high level inspection of the event records 103. The visual representations of the event records 103 on a scatter plot allows for easy identification of pattern events 108. Thus, the identification of at least one pattern 108 selected from the group consisting of repeated events, periodical events, missing events, abnormal events, and related events may quickly narrow down the scope of the inspection process, and may even point to the root cause of a software issue. Moreover, different sets of pattern events 108 may be identified by changing the combination of attributes 104 and dimensions 105 of the scatter plot.

In one embodiment of the invention, the ERV program 101 may display details of at least one of the one or more events records 103. Here, a user may select one of the dots located on the graphical representation 107. The selection of a dot may subsequently reveal information about the event record 103 found in the original log file 102.

In another embodiment of the invention, the ERV program 101 may modify the scatter plot by filtering the one or more event records 103 based on one or more filter criteria. The scatter plot may include hundreds or thousands of event records 103 within a short span of time. Consequently, many event records 103 (designated as colored dots on a scatter plot) may overlap each other and thus remain shielded from a user's view. However, by filtering irrelevant event records 103 from the scatter plot, a user may bring into view once previously shielded event records 103, and furthermore, uncover hidden patterns or relationships located within the data. An irrelevant event record 103 may be considered to be routine patterns, which do not offer much insight as to a systems problematic behavior.

The ERV program 101 may filter the one or more event records 103 by updating the "relevance score" dimension 105 of the event records 103. The relevance score may range from 0 to 1. Since irrelevant event records 103 may happen periodically, regardless of when the anomaly occurs, irrelevant event records 103 may appear as symmetric data points about the reference time. Thus, lower relevance scores may be assigned to these event records 103. In contrast, relevant event records 103 may not have this pattern and their distribution may tend to not appear as symmetric data points about the reference time. Thus, higher relevance scores may be assigned to these event records 103. Furthermore, the ERV program 101 may represent the relevance score of a data point based on opacity of the data points denoting the one or more event records 103. Similarly, the ERV program 101 may represent the relevance score of a data point based on the size of the data points.

The ERV program 101 may determine a "relevance score" through the use of concept of features. Here, the ERV program 101 may separate the attribute 104 "record message" into a plurality of words using any known morphological analysis method. Each word may be considered as a feature and one or more features may be shared between the one or more event records 103. Based on a specified reference time point on the scatter plot, the relevance score of an event record 103 may be calculated as:

$$\text{relevance score} = \frac{\Sigma_{features}\left(1 - \frac{t_1}{t_2}\right)}{\text{number of features}}$$

where $t_1$ and $t_2$ are the minimum and maximum time intervals between the occurrence of the feature and reference time. If the feature only occurs on one side of the reference time point, the feature may be considered unique and may be given a relevance score of 1.

It should be appreciated that various embodiments of the invention may provide one or more of the following advantages:

(i) simplification of the process of investigating log files;
(ii) creation of high level views of a software system that enable a user to detect and identify patterns from high level visual representations of a systems event logs, and thereby enabling a user to quickly narrow down the scope of the investigation in a systematic manner and progressively zoom in to potential problem areas;
(iii) ability to extract valuable information from the log files;
(iv) removal of noise by filtering based on the relevancy of each log event leads to further clarity of the relationships and trends between the log events;
(v) improved identification of patterns, pattern violations, and anomalies located within a series of logs and subsequent identification of the cause of an issue with regard to malfunctioning software components;
(vi) elimination for the need for manual review of log files and thereby a reduction in time and effort needed during software debugging, and
(vii) ability for information contained in log files to be universally understood by combining data, placing contextual information into perspective, and allowing for identification of areas of concern of a software system.

The aforementioned advantages need to necessarily be present in any given embodiment for the invention to be practiced.

Figure 5:
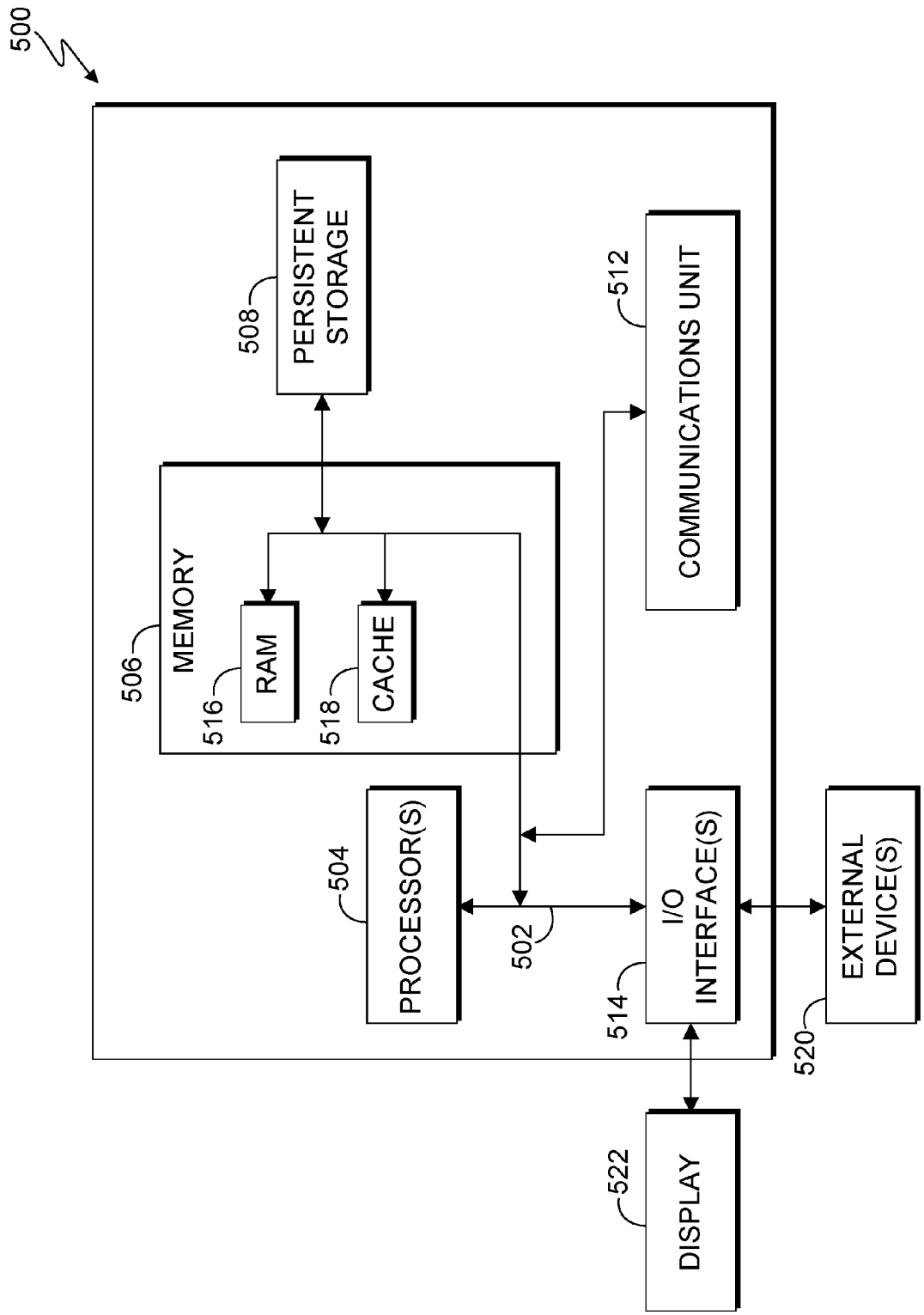
FIG. 5 is a block diagram of a computing apparatus 500 suitable for executing the event record visualization program 101 in accordance with at least one embodiment of the invention.

FIG. 5 is a block diagram depicting components of a computer 500 suitable for executing the ERV program 101. FIG. 5 displays the computer 500, the one or more processor(s) 504 (including one or more computer processors), the communications fabric 502, the memory 506, the RAM 516, the cache 518, the persistent storage 508, the communications unit 512, the I/O interfaces 514, the display 522, and the external devices 520. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the computer processor(s) 504, memory 506, persistent storage 508, communications unit 512, and input/output (I/O) interface(s) 514. The communications fabric 502 may be implemented with any architecture suitable for passing data or control information between the processors 504 (e.g., microprocessors, communications processors, and network processors), the memory 506, the external devices 520, and any other hardware components within a system. For example, the communications fabric 502 may be implemented with one or more buses.

The memory 506 and persistent storage 508 are computer readable storage media. In the depicted embodiment, the memory 506 comprises a random access memory (RAM) 516 and a cache 518. In general, the memory 506 may comprise any suitable volatile or non-volatile one or more computer readable storage media.

Program instructions for the ERV program 101 may be stored in the persistent storage 508, or more generally, any computer readable storage media, for execution by one or more of the respective computer processors 504 via one or more memories of the memory 506. The persistent storage 508 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 506 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 512, in these examples, provides for communications with other data processing systems or devices. In these examples, the communications unit 512 may comprise one or more network interface cards. The communications unit 512 may provide communications through the use of either or both physical and wireless communications links. In the context of some embodiments of the present invention, the source of the various input data may be physically remote to the computer 500 such that the input data may be received and the output similarly transmitted via the communications unit 512.

The I/O interface(s) 514 allow for input and output of data with other devices that may operate in conjunction with the computer 500. For example, the I/O interface 514 may provide a connection to the external devices 520, which may be as a keyboard, keypad, a touch screen, or other suitable input devices. External devices 520 may also include portable computer readable storage media, for example thumb drives, portable optical or magnetic disks, and memory cards. Software and data used to practice embodiments of the present invention may be stored on such portable computer readable storage media and may be loaded onto the persistent storage 508 via the I/O interface(s) 514. The I/O interface(s) 514 may similarly connect to a display 522. The display 522 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving one or more log files, each of said one or more log files comprising one or more logs, said one or more logs comprising structured data written in text format;
extracting one or more event records from said one or more logs, wherein each of said one or more event records comprises at least one of an event message, an event origin, and an event type;
normalizing each of said at least one event message, said normalizing further comprising normalizing variable fields located within each of said one or more event records into a set of predefined symbols;
for each event record of said one or more event records:
  determining one or more attributes based on said event record; and
  determining at least one dimension based on said event record, said at least one dimension being selected from the group consisting of:
  (a) time;
  (b) frequency;
  (c) message length; and
grouping said one or more event records into one or more attribute groups; and
ordering said one or more event records of each said one or more attribute groups by said one or more dimensions, each of said one or more event records of said one or more attribute groups being ordered according to at least one metric selected from the group consisting of:
  (a) time of occurrence;
  (b) message length;
  (c) frequency of occurrence;
  (d) importance;
  (e) relevance; and
generating one or more graphical representations of said one or more attribute groups, wherein at least one of said one or more graphical representations comprises:
  a scatter plot, said scatter plot displaying data based on at least one of said one or more events records, at least one of said one or more attributes, and at least one of said one or more dimensions, said scatter plot identifying at least one pattern event selected from the group consisting of:
  (a) repeated events;
  (b) periodical events;
  (c) missing events;
  (d) abnormal events; and
  (e) related events,
  said scatter plot further being modified by filtering said one or more event records based on one or more filter criteria, said filtering comprising updating a relevance score; and
  displaying details of at least one of said one or more event records.

* * * * *